UNITED STATES PATENT OFFICE.

WM. F. LADD AND MORRIS L. KEEN, OF NEW YORK, N. Y., ASSIGNEES, BY MESNE ASSIGNMENTS, OF CHARLES WATT AND HUGH BURGESS, OF LONDON, ENGLAND.

IMPROVEMENT IN MANUFACTURE OF PAPER FROM WOOD.

Specification forming part of Letters Patent No. 11,343, dated July 18, 1854; Reissue No. 608, dated October 5, 1858.

*To all whom it may concern:*

Be it known that CHARLES WATT and HUGH BURGESS, of London, England, did invent, make, and apply to use certain Improvements in Pulping and Disintegrating Vegetable Substances, (for which Letters Patent have been granted to them by Her Majesty the Queen of Great Britain, bearing date the 19th August, 1853;) and we do hereby declare that the following is a full, clear, and exact description of said invention and the mode of carrying out the same.

The wood or vegetable substances upon which it is intended to operate by this process should first be reduced to very fine shavings or cuttings, the finer the better. This may be done in any suitable machine. The shavings or vegetable substances are then to be boiled in a solution of caustic alkali, the strength of which, being dependent on the nature of the vegetable substance operated on, can only be learned by experience. By the "nature of vegetable substance" is meant its gummy or resinous nature or its absence from such substance. For deal or fir wood, which contain resinous matter, a solution of alkali of the strength indicated by 12° of the English hydrometer answers very well. The length of time necessary for this part of the process is somewhat dependent on the nature of the vegetable substance to be treated—that is, its resinous or gummy nature—and boiling in a solution of caustic alkali under pressure is of considerable importance. By the words "under pressure" is meant a pressure at, near, or above 300° of Fahrenheit scale, the ordinary pressure used by us being from 300° to 500°, in accordance with the nature of substance to be treated. The shavings or vegetable substances being pulped are then to be well pressed and washed. The pressings and washings may be saved and evaporated down and burned in a furnace suitably constructed, when they are again available for same purpose. The damp mass of materials being pulped are now to be exposed to the action of chlorine or the compounds of chlorine with oxygen, and can then be made into white paper, if the material used was not of a highly-resinous nature. If the material under treatment was of highly-resinous character, it should then be washed and placed in a diluted solution of caustic alkali, warm preferred. The vegetable substance then falls into in a dark pulpy mass, and when washed can be bleached by any desirable method known. Good white pulps will be obtained by the above processes, according to the resinous or non-resinous properties of materials under treatment, and the pulps will retain their clear appearance for any length of time in their pulpy state, or after they are made into paper. The above-described gasing or bleaching process is conveniently effected by placing the damp shavings, vegetable substance, or pulpy mass on racks or drawers about nine inches apart, one above another, arranged in a chamber, and allowing the chlorine or the compounds of chlorine with oxygen to enter the chamber and fill it. Of the compounds of chlorine with oxygen, we prefer that known as "protoxide of chlorine," or "hypochlorous," or "chlorous acid," or "euchlorine." If found more convenient, the chlorine or the compounds of chlorine with oxygen may be used in aqueous solution instead of the gaseous form. As soon as the shavings, vegetable substance, or pulpy mass have been sufficiently acted upon, the time required being as to their resinous or non-resinous properties, they may be removed, and the hydrochloric acid, which is the result of the above process, removed by washing and well pressing the material under process. This should be done with as little water as possible, as the acid may be saved and made use of for the reproduction of chlorine.

When the pulp obtained by the above-described process has been freed from its alkali by pressing and washing, (which pressings and washings liquor may be saved, as before described,) it may be bleached by the usual process, or, as we prefer, by the chlorite or hypochlorite of soda or potash, liberating the chlorous or hypochlorous acid by dydrochloric acid.

Having thus fully described the invention of said WATT and BURGESS, what we claim as of their invention, and desire to secure by Letters Patent, is—

The pulping or disintegrating of shavings of wood and other similar vegetable matter for making paper, in the manner substantially as herein described, according to the nature of the vegetable substance to be treated.

WM. F. LADD.
MORRIS L. KEEN.

Witnesses to the signature of William F. Ladd:

JAS. MONCUEF,
GEORGE W. WILLIS.

Witnesses to the signature of Morris L. Keen:

W. D. EVANS,
EPHRAIM MILLER.